United States Patent [19]

Komuro et al.

[11] 4,082,615
[45] Apr. 4, 1978

[54] THERMAL DECOMPOSITION PROCESS AND APPARATUS FOR ORGANIC SOLID MATERIALS

[75] Inventors: Takeo Komuro; Yukio Saito; Mizuno Hirato, all of Hitachi, Japan

[73] Assignee: The Agency of Industrial Science & Technology, Tokyo, Japan

[21] Appl. No.: 666,357

[22] Filed: Mar. 12, 1976

[30] Foreign Application Priority Data

Mar. 13, 1975 Japan ................................. 50-29584

[51] Int. Cl.² .................... C10B 9/00; C10B 49/10; C10B 49/22; C10B 53/02
[52] U.S. Cl. ..................................... 201/12; 201/2.5; 201/25; 201/29; 201/31; 202/88; 202/89; 202/215
[58] Field of Search .................. 201/4, 12, 25, 29, 31, 201/36, 37, 43, 44, 2.5; 202/99, 85, 88, 89, 215, 239; 48/209, 111

[56] References Cited

U.S. PATENT DOCUMENTS

| | | | |
|---|---|---|---|
| 1,985,304 | 12/1934 | Warner | 202/99 |
| 2,445,327 | 7/1948 | Keith | 201/28 |
| 2,527,197 | 10/1950 | Rollman | 48/206 |
| 2,527,198 | 10/1950 | Rollman | 48/206 |
| 3,117,064 | 1/1964 | Friedrich | 201/12 |
| 3,677,727 | 7/1972 | Godel | 201/31 |
| 3,703,442 | 11/1972 | Rammler et al. | 201/12 |
| 3,708,270 | 1/1973 | Birk et al. | 48/209 |
| 3,853,498 | 12/1974 | Bailie | 201/2.5 |
| 3,921,307 | 11/1975 | Marek et al. | 202/99 UX |

FOREIGN PATENT DOCUMENTS

2,443,740   3/1975   Germany ............................. 48/206

*Primary Examiner*—Barry S. Richman
*Assistant Examiner*—Bradley Garris
*Attorney, Agent, or Firm*—Beall & Jeffery

[57] ABSTRACT

A thermal decomposition process and apparatus of the fluidized bed type for organic solid materials, particularly organic solid waste material contained in urban rubbish comprising a fluidized bed thermal decomposition furnace, the interior of which is divided by a partition plate into two zones, namely a first zone for thermally decomposing the organic solid waste material in the absence of oxygen and a second zone mainly for burning the carbonized material produced as a result of thermal decomposition of the organic solid waste material. Non-condensable components of the gas resulting from the thermal decomposition of the organic solid waste material are recirculated as fluidizing gas into the first zone, while air is used as the fluidizing gas for the second zone. Heat for the thermal decomposition in the first zone is obtained from the combustion in the second zone and transferred by the intertransfer of fluidized solids between zones beneath the partition plate.

4 Claims, 4 Drawing Figures

THERMAL DECOMPOSITION PROCESS AND APPARATUS FOR ORGANIC SOLID MATERIALS

BACKGROUND OF THE INVENTION

The present invention relates to thermal decomposition using a fluidized bed for processing organic solid materials.

There have heretofore been proposed various types of thermal decomposition systems for thermally decomposing organic solid materials to obtain liquid or gaseous products. For example, methods of gasifying or liquifying coal include a method wherein the coal is thermally decomposed by externally supplied heat, and a further method in which part of the coal is directly burned for obtaining heat of combustion that is used as the heat source for the thermal decomposition of the remainder of the coal.

Also there are typical thermal decomposition furnaces of the fixed bed type, in which coal is thermally decomposed in stacked form within the thermal decomposition furnace, or of a fluidized bed type, wherein the coal is thermally decomposed while in a fluidized state above a grate within the furnace. As an example of the former type of furnace, a retort type continuous thermal decomposition furnace has been developed, and as an example of the latter type of furnace, there is a continuous or multi-stage fluidized bed type thermal decomposition furnace using at least two fluidized beds, one in a decomposition tower and one in a recovery tower.

While these thermal decomposition furnaces adopt the most suitable processing system and heat supplied system from various standpoints such as processed material, intended decomposition product to be recovered and economy, the heat supply system is particularly important and must be thoroughly investigated.

Assuming the case of thermally decomposing, for instance, urban rubbish as the organic solid material pertaining to the invention for the purpose of recovering useful oily (liquid) or gaseous substances by supplying the heat for the thermal decomposition from an external force, such thermal decomposition is not worthwhile at all in view of the conversion of the waste material into usable resources unless the recovered substance is more valuable in cost than the supplied energy.

Liquification or gasification of organic solid waste materials through dry distillation decomposition is now on the mid course of development, and various dry distillation decomposition methods have been proposed.

FIG. 1 outlines the flow of a prior art process relating to organic solid waste material. Here, an organic solid waste material 20 is delivered from a belt conveyor 6 into a hopper 5, whence it is supplied through a rotary valve 4 into a hermetically sealed retort 1. The waste material 20 supplied into the retort 1 is burnt in a bottom zone of the retort 1 and it is contacted by high temperature air supplied into the retort 1 from below by means of an air delivery duct 2 and through a grate 11 provided in the bottom of the retort 1. The organic solid waste material 20 supplied into the retort 1 divides itself into a portion in a drying zone 13, a portion in a thermal decomposition zone 14 and a portion in a combustion zone 15, and the product gas resulting from the thermal decomposition is led through a duct 7 extending from an upper portion of the retort 1 into a condenser 8 for condensation therein. The resulting condensate liquid is separated by a gas-liquid separator 9 and then collected in a vessel 10, while the non-condensable gas is partly led through ducts 18 and 17 to the outside and partly recirculated through a duct 12 to the underside of the grate 11 within the retort 1. The recirculated gas is burned within the bottom of the retort 1 and used as a source of heat for the required combustion within zone 15, thermal decomposition within zone 14, and drying of the waste material within zone 13. Designated a dust separator, 20' is arranged so as to return dust and the like to the retort after it has been separated from the gases prior to their passage into the duct 7.

In this thermal decomposition system, part of the organic solid waste material is burned and the resultant heat of combustion is used as a source of heat for combustion, thermal decomposition, and drying. While this thermal decomposition system is mainly used for the purpose of recovering liquid substances, the product gas obtainable by this method is diluted by the combustion waste gas and nitrogen gas in the air used for the combustion and is therefor a low caloric gas with a heat generation capacity of 300 to 500 kcal/Nm$^3$. Because of this fact, the value of this thermal decomposition system is mainly with respect to the recovery of liquid substances. This, however, means a loss of the useful composition of the organic solid waste material that might be derived by some or other means and constitutes a factor that makes this method economically unfeasible.

SUMMARY OF THE INVENTION

It is an object of the present invention to provide a thermal decomposition system for the process of thermally decomposing organic solid waste materials, which permits recovery of high caloric product gases not diluted with nitrogen and other gases, which is unlike those obtainable in the prior art, as well as the recovery of useful liquid substances, and also wherein the heat obtained from the complete combustion of the carbonized material obtained as a by-product of the dry distillation decomposition is effectively utilized as the heat source for the thermal decomposition of the waste materials.

BRIEF DESCRIPTION OF THE DRAWINGS

Further objects, features and advantages of the present invention will become more clear from the following detailed description of the drawings, wherein.

DETAILED DESCRIPTION OF THE INVENTION

Figure 1:
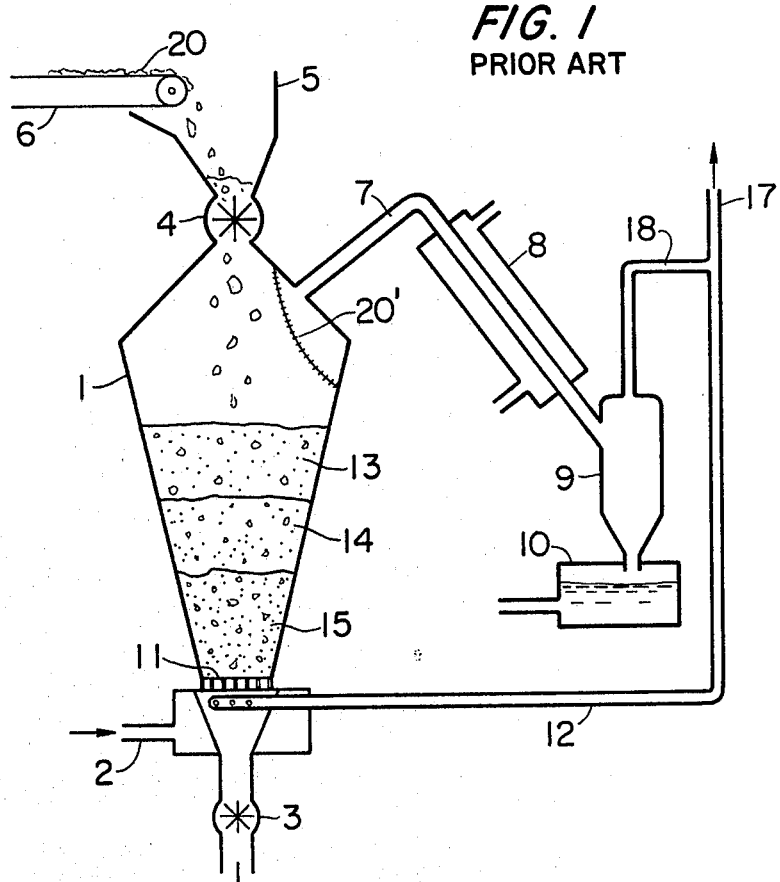
FIG. 1 is a schematic representation of a prior art retort type thermal decomposition apparatus that has already been explained.

The invention broadly relates to thermal decomposition of organic solid waste materials in a fluidized bed type furnace as mentioned earlier. In accordance with the present invention, the heat of combustion of carbonized material produced as a result of the thermal decomposition of the aforementioned organic solid waste material is mainly used as the heat source for the thermal decomposition, and the heat is transferred to the incoming waste material through scattering of the solid particles by the fluidizing medium of the fluidized bed to cause the thermal decomposition of the waste materials, whereby the content of the diluting gas, such as nitrogen in the gaseous product obtained through the thermal decomposition of the organic solid waste material is minimized to obtain high calorie gas products.

To this end, the fluidized bed type thermal decomposition furnace according to the present invention consists of a single tower, in which the fluidized bed is divided into two distinct zones, namely a decomposition zone and a combustion zone, and the combustion heat produced in the combustion zone is transferred to the thermal decomposition zone through scattering by a fluidized medium in the fluidized bed and consumed as reaction heat for the thermal decomposition of the organic solid waste materials, while transferring carbonized material produced from the organic solid waste material or part of the waste material to the combustion zone through scattering by the intermediary of the fluidized medium for combustion in the combustion zone.

More specifically, in the fluidized bed type thermal decomposition furnace according to the present invention, a unified fluidized bed therein is divided by a partition plate into two zones, one for thermally decomposing the organic solid waste materials and one for combustion of the carbonized material produced through the thermal decomposition of the waste materials. Both zones are furnished with separate fluidizing gases. More particularly, a non-condensable gaseous product resulting from the thermal decomposition is recirculated as the fluidizing gas into the thermal decomposition zone, while air is supplied as the fluidizing medium and also as auxiliary combustion medium to the combustion zone.

As the thermal decomposition of the organic solid waste material proceeds in the above fluidized bed type thermal decomposition furnace, a product gas not containing nitrogen and a product liquid are recovered. The temperature for thermally decomposing the organic solid waste materials is controlled by vertically displacing the aforementioned partition plate. By increasing the proportion of combustion in the combustion zone, the decomposition temperature is increased. In the case when thermal balance between the thermal decomposition zone and the combustion zone is not achieved with solely the carbonized material produced through the thermal decomposition, that is, when the heat source is insufficient, part of the organic solid waste material as well as the carbonized material is burned in the combustion zone to make up for the insufficient heat source. In other words, it is a structural feature of the fluidized bed type thermal decomposition furnace according to the present invention that the decomposition temperature can be freely adjusted by vertically displacing the partition plate.

While the invention is applicable to the thermal decomposition process dealing with the general organic solid material, in view of the recently popular problems concerning urban rubbish disposal, the present invention will be described in conjunction with the process of thermally decomposing organic solid waste materials contained in urban rubbish.

While at present the majority of urban rubbish is transported to reclamation sites and cast there or incinerated, in the future, continuous disposal of the urban rubbish in the reclamation will be severely restricted by laws. On the other hand, the incineration of the combustible rubbish, which is presently the major disposable method, is not only inefficient but also constitutes a cause of air contamination; in this actual status of the art, various contaminate removal means are provided on the off-gas ducts of incinerators in order to reduce air contamination. Because of these problems and also in view of the present situation calling for efforts to recover useful components as resources from the organic solid waste material, in the near future, it will be common sense to make use of the organic solid waste material as a resource of some sort through thermal decomposition or other means.

While the thermal decomposition is defined as a chemical change of the material through thermal reactions, the high temperature dry distillation method, in which thermal decomposition reactions are caused to proceed in a non-oxygen atmosphere completely lacking in oxygen within a hermetically sealed retort, is practically carried out under normal pressure and in the absence of any catalyst. Accordingly, this method is the most efficient method for recovering liquid and gaseous substances through thermal decomposition in view of both yield and the character of the products. In the meantime, when carrying out thermal decomposition of the organic solid waste materials on an industrial scale under normal pressure and in the absence of any catalyst, it is ideal to opproximate the yield and character of the products that are obtained by the aforementioned high temperature dry distillation process in the completely non-oxygen atmosphere.

Although the product obtainable through the aforementioned dry distillation decomposition of organic solid waste materials in the absence of oxygen varies depending upon the decomposition temperature, composition of the waste materials and so forth, on the average, 50 to 60% by weight of the materials is converted into liquid, of which 60 to 75% by weight is water. Other components of the liquid product include paraffin-like materials, benzene, toluene, squalene monomer, formic acid, acetic acid, ketone family compounds, furfural and tar materials. The gaseous products obtainable, on the other hand, are 0 to 45% by weight, and they include non-condensable components such as hydrogen, carbon dioxide, carbon monoxide, methane, ethane, propane, propylene and butane. Besides the gaseous and liquid products, charred materials (that is, carbonized materials) result as a residue. These carbonized materials have an amorphous carbone crystal structure and have high heat generation capacities ranging from 4,000 to 5,000 kcal/kg.

The present invention provides a thermal decomposition apparatus, which permits recovery of useful components of the organic solid waste materials through the dry distillation decomposition thereof, and more ideally, permits a realization, on an industrial scale, of high yield and quality gaseous and liquid products corresponding to those products obtainable through the high temperature dry distillation decomposition process in the absence of oxygen. Unlike the prior art high temperature dry distillation decomposition processes where the heat for the thermal decomposition is supplied from an external heat source, it is a feature of the present invention that the heat required for the thermal decomposition is derived from the combustion of carbonized material produced as residue from the thermal decomposition of the organic solid waste materials.

A specific form of the present invention will now be described with respect to FIG. 2, which illustrates the principals underlying the invention.

Figure 2:
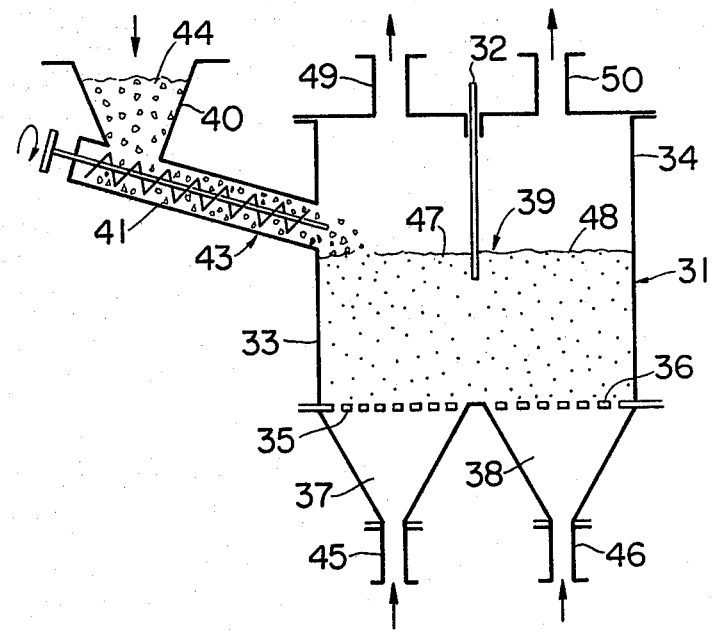
FIG. 2 is a schematic representation of the present invention employing a fluidized bed type thermal decomposition apparatus.

In FIG. 2, a fluidized bed type thermal decomposition furnace 31 has its interior divided by a vertically moveable partition plate 32 inserted into the furnace from the top of the furnace so as to produce two separate zones, namely a first zone (thermal decomposition zone) 33 for mainly effecting thermal decomposition and a second zone (combustion zone) 34 for mainly effecting combustion. The first and second zones 33 and 34 are provided in their lower portion with respective first and second grates 35 and 36, and first and second gas chambers 37 and 38. A fluidized bed 39 is provided in the first and second zones 33 and 34 on the first and second grates 35 and 36 so as to bury at least the tip portion of the partition plate 32. Organic solid waste material 44 is supplied onto the fluidized medium 47 in the first zone 33 by supply means 43 consisting of a hopper 40 and a feed screw 41. The fluidizing gas for the first zone 33 is supplied through duct 45, gas chamber 37 and first grate 35 into the first zone 33 to fluidize the bed 47, and the fluidizing gas for the second zone 34 is supplied through duct 46, the gas chamber 38 and the second grate 36 into the second zone 34 for fluidizing the bed 48. Condensable and non-condensable gases produced through thermal decomposition of the organic solid waste material within the first zone 33 are received through a duct 49 extending from the top of the first zone. On the other hand, charred materials resulting from the thermal decomposition within the first zone 33 as residue of the waste materials are transferred together with the fluidizing medium into the second zone 34 for combustion therein, and the resulting combustion waste gases are exhausted through a duct 50 to the outside of the system after separation of ash and the like. Part of the aforementioned non-condensable gases produced through the thermal decomposition are circulated as fluidizing gas into the first zone 33, while air is used as the fluidizing gas for the second zone 34.

The transfer of substances and heat between the first and second zones 33, 34 is effected mainly by the fluidizing medium 39. Normally, the organic solid waste materials supplied from the supply means 43 into the first zone 33 substantially instantaneously undergo thermal decomposition and hence carbonization, with the gas produced by the thermal decomposition being recovered through the duct 49. The carbonized product produced in the first zone 33 is transferred to the second zone 34 through scattering due to the violent fluidizing phenomenon of the fluidizing medium 39 and is burned in the fluidizing medium 48 within the second zone 34, and the resulting waste combustion gases are exhausted to the outside of the system through the duct 50. The heat produced from the combustion of the carbonized material within the second zone 34 is transferred to the first zone 33 by the scattering effect of the fluidizing medium 39 and also through conduction and convection. The transfer of the substance and heat is continuously effected and its extent can be controlled by adjusting the depth of insertion of the partition plate 32 into the fluidized bed 39.

Assuming that sufficient air is supplied from the duct 46 to achieve complete combustion of the materials transferred to the second zone 34, the required quantity of scattering transfer from first zone 33 to second zone 34 is determined from the following thermal balance of the entire system as:

$$F_B = \frac{G_1\Delta H_4 + G_2\Delta H_5 + F_4 H_s - (G_3\Delta H_1 + G_4\Delta H_2 + F_4\Delta H_6) + Q}{H_R + H_S} \quad (1)$$

where $F_B$ is the quantity of material (kg/h) transferred from the first zone 33 to the second zone 34, $G_1$ is the quantity of the product gas (kg/h), $G_2$ is the quantity of exhaust gas (kg/h), $G_3$ is the quantity of fluidizing gas (kg/h), $G_4$ is the quantity of fluidizing air (kg/h), $F_4$ is the quantity of supply material, $\Delta H_4$ is the enthalpy (kcal/kg) of the product gas at temperature $t_1$, $\Delta H_5$ is the enthalpy (kcal/kg) of the exhaust gas at temperature $t_3$, $\Delta H_1$ is the enthalpy (kcal/kg) of the fluidizing gas at temperature $t_1$, $\Delta H_2$ is the enthalpy (kcal/kg) of the air at temperature $t_1$, $\Delta H_6$ is the enthalpy (kcal/kg) of the supply material, $H_R$ is the average quantity of heat of combustion (kcal/kg) of the material transferred through scattering; $H_S$ is the quantity of the heat needed for the thermal decomposition (kcal/kg) of the organic solid waste material, and Q is the heat loss (kcal/h).

The scattering transfer quantity $F_B$ of material in equation (1) is further ruled by the following equation:

$$F_B = f(H_F, F) \quad ..(2)$$

where $H_F$ is the depth (cm) of insertion of the partition plate 32, and F is the index of transfer of the scattered material based on the fluidization characteristic thereof.

Further, it is another feature of the invention that the reaction temperature $T_R$ (°C) of the thermal decomposition can be suitably set by appropriately selecting $F_B$ provided sufficient air $G_4$ (kg/h) is supplied for the combustion of the burnable scattering transfer material $F_B$. Stated mathematically $$T_R = f(F_B) \quad ..(3)$$

According, the scattering transfer effect has been experimentally studied by varying the insertion depth $H_F$ of the partition plate which greatly affects the quantity of the scattering transfer material.

Figure 3:
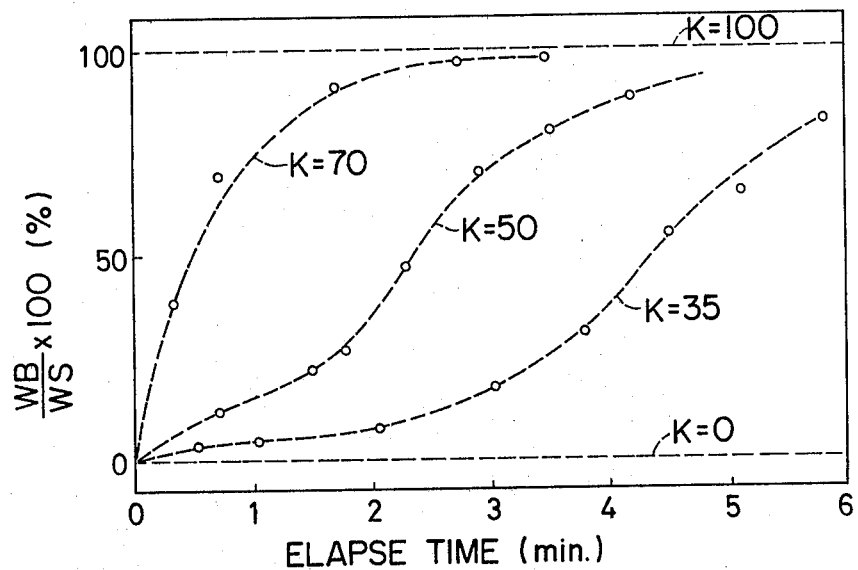
FIG. 3 is a graph showing the results of experiments concerning the effects of a partition plate used in the apparatus according to the present invention upon the transfer by scattering.

FIG. 3 shows results of experiments conducted with various values of K which is given as $$K = \frac{H_F}{H_{Bed}} \times 100 \, (\%) \quad (4)$$

where $H_{Bed}$ is the height (cm) of the fluidized bed when the quantity of fluidizing gas is $G_3$ and $G_4$ (kg/h), and $H_F$ is the insertion depth (cm) of the partition plate from the surface of the fluidized bed. When $H_F = 0$, there is no effect of the partition plate, and in this case K = 0%. When $H_F = H_{Bed}$, at which time the partition plate is in contact with the grates, K = 100%. The experiments were conducted by inserting a partition plate in a fluidized bed of 10 cm by 30 cm at the symmetrical position thereof and blowing air as fluidizing gas from below the bed. As the fluidizing medium, silica sand with an average grain size of 60 mesh was used. The fluidization start speed Umf of the fluidizing medium was about 6.7 cm/sec. To determine the scattering transfer quantity, polyethylene pellets about 2 mm in one side (which were commercially available) were thrown onto the bed in one of the zones, and after a predetermined period of time, the air supply was stopped and polyethylene and silica sand in both zones were separated. In this way, the quantity of polyethylene, that is, the scattering transfer quantity, was determined for various air supply periods by setting K to various values.

The plot of FIG. 3 was obtained by supplying the fluidizing gas at a uniform rate corresponding to 2.5 times the fluidization start speed Umf. Here, the scattering transfer quantity is given in the form of the ratio of the quantity $W_B$(g) of polyethylene transferred by scattering to the fluidized bed in the combustion zone to the residual polyethylene quantity $W_S$ (g) in the fluidized bed in the thermal decomposition zone where the polyethylene was initially supplied. It will be understood that if $W_B/W_S$ is unity, the quantity of polyethylene in the fluidized bed portions on both sides of the partition plate is uniform. The scattering transfer quantity is greatly varied according to the value of K in equation 4. Thus, it will be readily appreciated that by controlling the value of K in equation 4, the rate of combustion in the combustion zone can be controlled for suitably setting the thermal decomposition temperature $T_R$.

Figure 4:
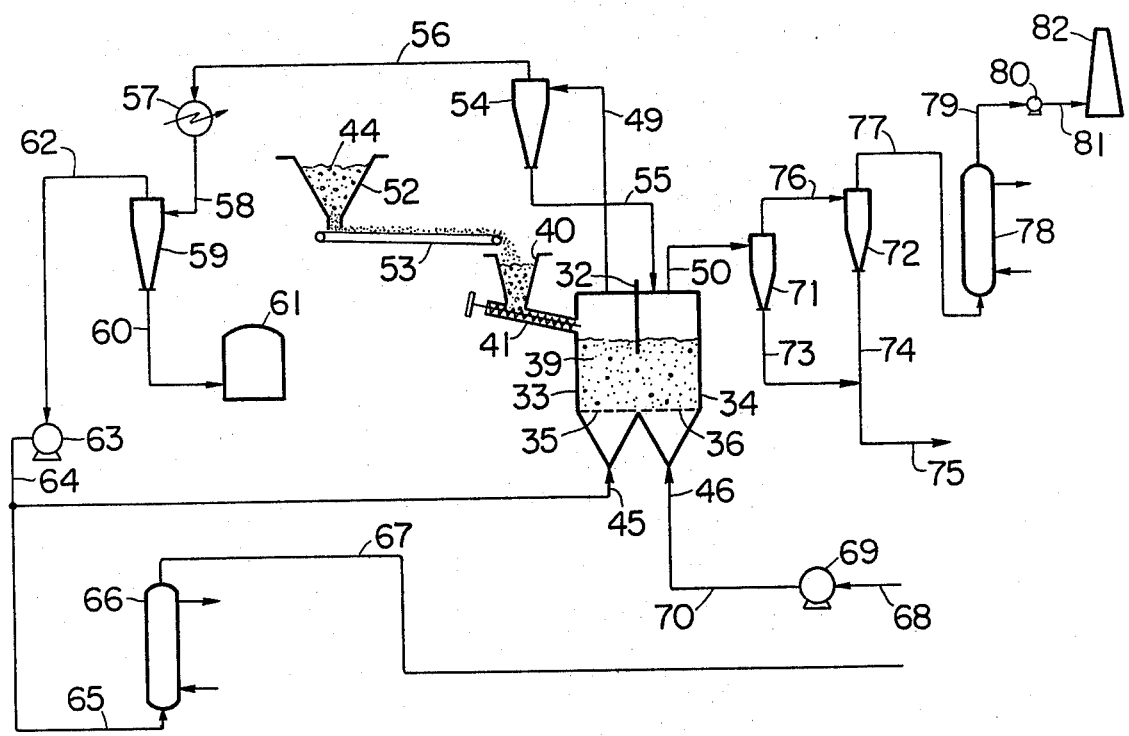
FIG. 4 is a more complete schematic representation of a plant employing the system of FIG. 2 for the present invention as a dry distillation decomposition system for the treatment of organic solid waste materials, particularly urban rubbish.

FIG. 4 shows a dry distillation decomposition process for organic solid waste materials using a fluidized bed type thermal decomposition furnace according to the invention. In the figure, reference numerals 31 to 50 designate the same parts as shown in FIG. 2, constituting the fluidized bed type thermal decomposition furnace according to the invention. The other parts are provided to obtain requisite functions in the process.

Organic solid waste material 44 in a suitably broken form is supplied from hopper 52 through belt conveyor 53, hopper 40 and screw 41 into thermal decomposition zone in the fluidized bed type thermal decomposition furnace 31. Silica sand is fluidized as the fluidizing medium 39 within the decomposition furnace 31 that is divided by the partition plate 32 into the thermal decomposition zone 33 and the combustion zone 34. The waste material 44 supplied to the thermal decomposition zone 33 is thermally decomposed under the aforementioned principals, and the resultant non-condensable and condensable gases are led through line 49 to a cyclone 54, in which solid matter accompanying the gas is separated. The separated solid matter is supplied through a line 55 to the combustion zone 34 for combustion therein. Meanwhile, the product gas led from the cylone 54 flows through a line 56 to a condenser 57 for cooling therein. The output of the condenser 57 is passed through a line 58 to a gas-liquid separator 59, in which the non condensable gas and liquid are separated from each other. The liquid separated is led through a line 60 to a tank 61 for storage therein, while the non-condensable gas is led through a line 62 to a gas recirculation pump 63 for pressurization. Part of the pressurized gas output is supplied through line 64 and duct 45 into the thermal decomposition zone 33 as the fluidizing gas for the thermal decomposition zone, while the remaining gas is passed through a line 65 to a gas refining tower 66 for removal of odor and harmful components, and thereafter passed through line 67 as urban fuel gas or the like.

In the combustion zone 34, air is supplied as the fluidizing and auxiliary combustion gas through line 70 and duct 46 from a pump 69 that pressurizes the air leading from line 68. The carbonized material produced as the by-product of the thermal decomposition of the organic solid waste material and also the non-decomposed portion of the waste material, are transferred through scattering by the fluidizing medium from the thermal decomposition zone 33 to the combustion zone 34 beneath the partition plate 32 in accordance with the aforementioned principals, and in the combustion zone 34, these materials are burned in the fluidizing bed and the resultant heat of combustion is transferred by the fluidizing medium through the heat transfer mechanisms mentioned above, such as conduction and convection, to the thermal decomposition zone 33, where the heat is used within the zone 33 as the heat source for the thermal decomposition of the waste material. The ash and combustion waste gases resulting from the combustion within the combustion zone 34 are passed through a duct 50 and a multi-stage cyclone unit of cyclones 71, 72. The ash is taken out of the cyclones through lines 73, 74 and 75 for disposal, reclamation or the like. On the other hand, the combustion waste gas from the cyclones 71 and 72 is led through lines 76, 77 to an absorption tower 78, in which harmful components of the waste gas are removed before the waste gas is discharged to the atomsphere through line 79, exhausting pump 80, line 81 and chimney 82.

As the yield of products from the organic solid waste material contained in the urban rubbish converted by the fluidized bed type thermal decomposition furnace according to the present invention, 47% by weight and 36% by weight of the material were converted to the liquid and gaseous products respectively at the decomposition temperature of 470° C, and 43% by weight and 28% by weight were converted to the respective liquid and gas products at a decomposition temperature of 550° C. The rest of the material was consumed as the heat source for the thermal decomposition, with the remainder of a small amount of ash.

In order to quantitatively evaluate the yield, dry distillation decomposition tests were conducted by using an artificially prepared rubbish imitating the organic solid waste materials contained in the urban rubbish. The artificial rubbish composed: 70% by weight of paper broken into pieces of a size of 3 to 4 millimeters, 10% by weight of sawdust and 20% by weight of a mixture consisting of the same proportions of polystyrene, polyethylene and polypropylene. The conversion of this artificial rubbish into liquid product was 47, 45 and 35% by weight at respective decomposition temperatures of 450°, 500° and 550° C, while conversion into gaseous product was 27, 36 and 30% by weight respectively at these temperatures.

The liquid product obtained from the organic solid waste material in the urban rubbish contains 70 to 76% by weight of water, and gas-chromatographic analysis reveals that the rest of the liquid product is a very complicated mixture containing formic acid, acetic acid, formaldehyde, methanol, benzene, toluene, squalene, glucose and tar materials. The liquid product obtained from the artificial rubbish contained 65 to 70% by weight of water, with the rest containing the same organic substances as in the case of the urban rubbish. As the tar materials 60 to 80% by weight was lipoglucosan, which is thought to be the primary decomposition product of the cellulose component of paper and wood. The tar material is contained by 30 to 35% by weight in the liquid product after removal of the water content. On the other hand, the components in the gaseous product that are recognizable through the gas-chromatographical analysis are $H_2$, $CO$, $CO_2$, $CH_4$, $C_2H_6$, $C_2H_4$, $C_3H_3$, $C_3H_6$, $n-C_4H_{10}$ and traces of $O_2$ and $N_2$. Table 1 below shows examples of results of the quantitative analysis of the thermal decomposition product.

TABLE 1

| Rubbish | Urban Rubbish | Artificial Rubbish | |
|---|---|---|---|
| Decomposition Temperature | 550° C | 450° C | 550° C |
| Component | | | |
| $H_2$ | 10.69 mol% | 13.93 | 19.77 |
| $CO$ | 25.13 | 16.79 | 19.11 |
| $CH_4$ | 13.44 | 12.99 | 12.03 |
| $C_2H_6$ | 3.56 | 4.32 | 3.54 |
| $C_2H_4$ | 0.92 | 2.24 | 2.15 |
| $C_3H_3$ | 0.63 | 1.63 | 1.21 |
| $C_3H_2$ | — | — | — |
| $C_3H_6$ | 2.32 | 4.32 | 3.82 |
| $i\text{-}C_4H_{10}$ | — | — | — |
| $n\text{-}C_4H_{10}$ | 2.10 | 3.22 | 2.13 |
| $N_2$ | 6.73 | 7.24 | 6.31 |
| $O_2$ | 0.02 | 0.01 | 0.03 |
| $CO_2$ | 27.21 | 21.25 | 23.25 |
| A | Trace | — | — |
| B | Trace | — | — |
| C | Trace | — | — |

These results of gas-chromatographical analysis show that it is possible to obtain a high caloric gaseous product with a heat generation capacity of 4,500 to 5,000 kcal/Nm³, which is 10 to 12 times the aforementioned heat generation capacity of 300 to 500 kcal/Nm³ in the case of the prior art.

This is because of the fact according to the present invention, dilution with nitrogen does not result, which is an effect of the present invention. While 20 to 30% of $CO_2$ is contained in the product gas, this is produced in the process of decomposition of the cellulose component in paper, wood and the like. This $CO_2$ gas contained in the product gas may be removed to a certain extent by washing the product gas in an alkaline aqueous solution within an absorption tower or the like, so that it is possible to further increase the heat generating capacity of the product gas with reduction of the $CO_2$ content. Thus, it is possible to expect direct use of such gas as industrial or urban fuel gas.

The primary feature of the fluidized bed type thermal decomposition apparatus for processing organic solid material according to the present invention resides in that by virture of the division of the interior of the decomposition furnace into the thermal decomposition zone and combustion zone, a gas product mainly composed of high caloric components can be recovered from the thermal decomposition zone. A second feature is that the heat of combustion of carbonized material produced as by-product through the thermal decomposition of the aforementioned organic material can be burned as the heat source for the thermal decomposition. As a third feature, while the control of the temperature of dry distillation decomposition is usually difficult compared to the case of combustion, thus posing difficulty in recovering product gas or liquid of uniform composition, in accordance with the present invention it is possible to freely set the decompositiontemperature on the basis of the aforementioned effect of the partition plate. Thus, a product gas having a fixed composition to some extend can be recovered. In particular, the dry distillation decomposition apparatus having flexibility according to the present invention is advantageous for organic solid waste material because the composition of the waste material varies depending upon the place of occurrence, season and time of the day and hence requiring varying decomposition temperatures to obtain uniformity of the product gas composition.

While a preferred embodiment of the present invention has been described in detail, for purposes of illustration and the advantages of the specific details, further embodiments, modifications and variations are contemplated according to the broader aspects of the present invention, all as determined by the spirit and scope of the following claims.

What is claimed is:

1. A method for thermally decomposing organic solid materials for extracting usable components, comprising the steps of:

delivering the unprocessed organic solid material into a thermal decomposition zone;

fluidizing the organic solid material in the decomposition zone with a basically nonoxidizing gas;

heating the fluidized organic solid material within the decomposition zone to a temperature at least sufficient to thermally extract usable gaseous and liquid components from said organic solid material;

transferring the thus thermally decomposed organic solids while in the fluidized state to a combustion zone;

fluidizing and burning the transferred decomposed organic solids with oxidizing gas within the combustion zone;

maintaining said decomposition and combustion zones laterally adjacent each other and separated by a partition which extends at least partially into the fluidized bed of both zones and leaves an area of free fluidized bed communication between both zones beneath the lower end of said partition to permit said step of transferring and further the transfer of heat of combustion from the combustion zone to the decomposition zone as a part of said step of heating;

removing the product gases from the thermal decomposition zone separately from the gases in the combustion zone; and controlling the temperature within the thermal decomposition zone by adjusting the extent that the partition extends into the fluidized beds between the zones to correspondingly adjust the area of free fluidized communication between the zones and corrrespondingly adjust the quantity of solid material that will transfer from the thermal decomposition zone to the combustion zone for combustion.

2. The method of claim 1, further including the steps of processing the gases withdrawn from the thermal decomposition zone by separating noncondensable gases from vapors, condensing the vapors to form liquid components, and passing at least a portion of the noncondensable gases through the thermal decomposition zone as the fluidizing gas.

3. A thermal decomposition apparatus for processing organic solid materials to obtain usable components, comprising:

a fluidized bed furnace having partition means extending into the fluidized bed dividing the interior of said furnance into a thermal decomposition zone and a combustion zone, and providing an area of free fluid communication between both said zones beneath the lower end of said partition means to permit mutual transfer of fluidized solids in each direction between said zones;

means for feeding the organic solid materials into the thermal decomposition zone;

means for withdrawing gaseous materials directly from the thermal decomposition zone separately from gases within the combustion zone;

means for condensing the vapors and separating the condensate from the remaining gases that have been withdrawn from the thermal decomposition zone;

means for fluidizing the organic solids within said thermal decomposition zone with a substantially nonoxidizing fluidizing gas;

means for fluidizing the thermally decomposed solids transferred from said thermal decomposition zone to said combustion zone and simultaneously burning said thermally decomposed solids with an oxidizing gas;

means for removing the products of combustion directly from said combustion zone separately from the gases within the decomposition zone and;

means for moving said partition means to adjust the area of free fluidized bed communication for correspondingly adjusting the quantity of thermally decomposed solids that will transfer from said thermal decomposition zone to said combustion zone and controlling the temperature within said thermal decomposition zone.

4. The apparatus of claim 3, further including means for pressurizing at least a portion of the noncondensable gases obtained from said thermal decomposition zone and for passing the pressurized noncondensing gases through the thermal decomposition zone as the fluidizing gas.

* * * * *

UNITED STATES PATENT AND TRADEMARK OFFICE
CERTIFICATE OF CORRECTION

PATENT NO. : 4,082,615
DATED : April 4, 1978
INVENTOR(S) : Takeo Komuro, Yukio Saito and Mizuho Hirato It is certified that error appears in the above-identified patent and that said Letters Patent are hereby corrected as shown below:

Third Inventor's name:

Change "Mizuno" to --Mizuho--

Signed and Sealed this

Twenty-ninth Day of August 1978

[SEAL]

Attest:

RUTH C. MASON
*Attesting Officer*

DONALD W. BANNER
*Commissioner of Patents and Trademarks*